United States Patent [19]

Aihara

[11] Patent Number: 5,457,801
[45] Date of Patent: Oct. 10, 1995

[54] POWER SAVING SYSTEM

[75] Inventor: Norio Aihara, Tokyo, Japan

[73] Assignee: Kabushiki Kaisha Toshiba, Kawasaki, Japan

[21] Appl. No.: 344,604

[22] Filed: Nov. 18, 1994

Related U.S. Application Data

[63] Continuation of Ser. No. 206,275, Mar. 7, 1994, abandoned, which is a continuation of Ser. No. 84,963, Jul. 2, 1993, abandoned, which is a continuation of Ser. No. 875,217, Apr. 28, 1992, abandoned, which is a continuation of Ser. No. 772,122, Oct. 9, 1991, abandoned, which is a continuation of Ser. No. 472,065, Jan. 30, 1990, abandoned.

[30] Foreign Application Priority Data

Jan. 31, 1989 [JP] Japan ........................... 1-19645

[51] Int. Cl.⁶ ........................... G06F 1/32
[52] U.S. Cl. ........................ 395/750; 364/707; 364/234; 364/234.2; 364/273.1; 364/232.91; 364/DIG. 1
[58] Field of Search .................... 395/550, 750; 364/707

[56] References Cited

U.S. PATENT DOCUMENTS

| | | | |
|---|---|---|---|
| 4,089,062 | 5/1978 | McElroy | 395/700 |
| 4,171,539 | 10/1979 | Tawfik et al. | 395/750 |
| 4,203,153 | 5/1980 | Boyd | 395/750 |
| 4,316,247 | 2/1982 | Iwamoto | 364/707 |
| 4,317,181 | 2/1982 | Teza et al. | 364/707 |
| 4,479,191 | 10/1984 | Nojima et al. | 364/707 |
| 4,545,030 | 10/1985 | Kitchin | 395/550 |
| 4,562,535 | 12/1985 | Vincent et al. | 395/325 |
| 4,570,219 | 2/1986 | Shibukawa et al. | 364/707 |
| 4,571,702 | 2/1986 | DeArras | 364/707 |
| 4,598,383 | 7/1986 | Leach | 395/750 |
| 4,615,005 | 9/1986 | Maejima et al. | 364/707 |
| 4,649,490 | 3/1987 | Manduley et al. | 364/466 |
| 4,667,289 | 5/1987 | Yoshida et al. | 364/707 |
| 4,698,748 | 10/1987 | Juzswik et al. | 364/707 |
| 4,866,758 | 9/1989 | Heinzelman | 379/94 |
| 4,876,597 | 10/1989 | Roy et al. | 358/108 |

FOREIGN PATENT DOCUMENTS 0208287  1/1987  European Pat. Off..
578209  10/1984  Japan.

OTHER PUBLICATIONS

Toshiba T1600 Portable Personal Computer User's Manual, Toshiba Corporation, Sep. 1988.

*Primary Examiner*—Jack B. Harvey
*Assistant Examiner*—Glenn A. Auve
*Attorney, Agent, or Firm*—Finnegan, Henderson, Farabow, Garrett & Dunner

[57] ABSTRACT

In a personal computer having a logic circuit constituted by low-power consumption elements such as CMOS elements, a power saving system includes a register in which control data can be set from a keyboard or by software, and switches for allowing and stopping power supply from a power supply to an oscillator on the basis of control data from the register. Supply of clock signals to a disabled logic circuit can be stopped by an operator's decision. In initialization processing of a driver routine of an extended card optionally connected to the personal computer, power supply designation information is set in the register. In the completion routine, power supply stop designation information is set in the register.

12 Claims, 5 Drawing Sheets

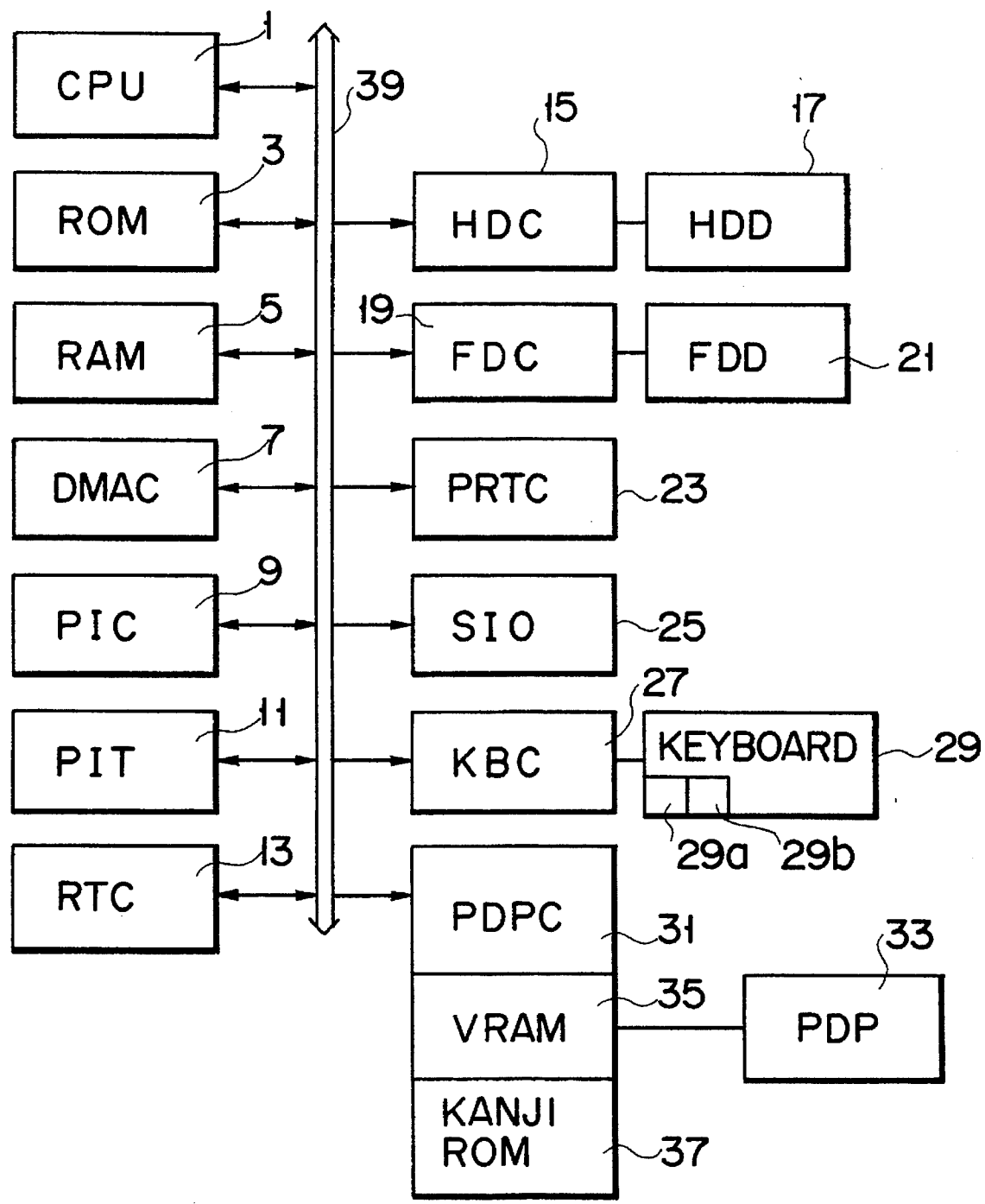
F I G. 1

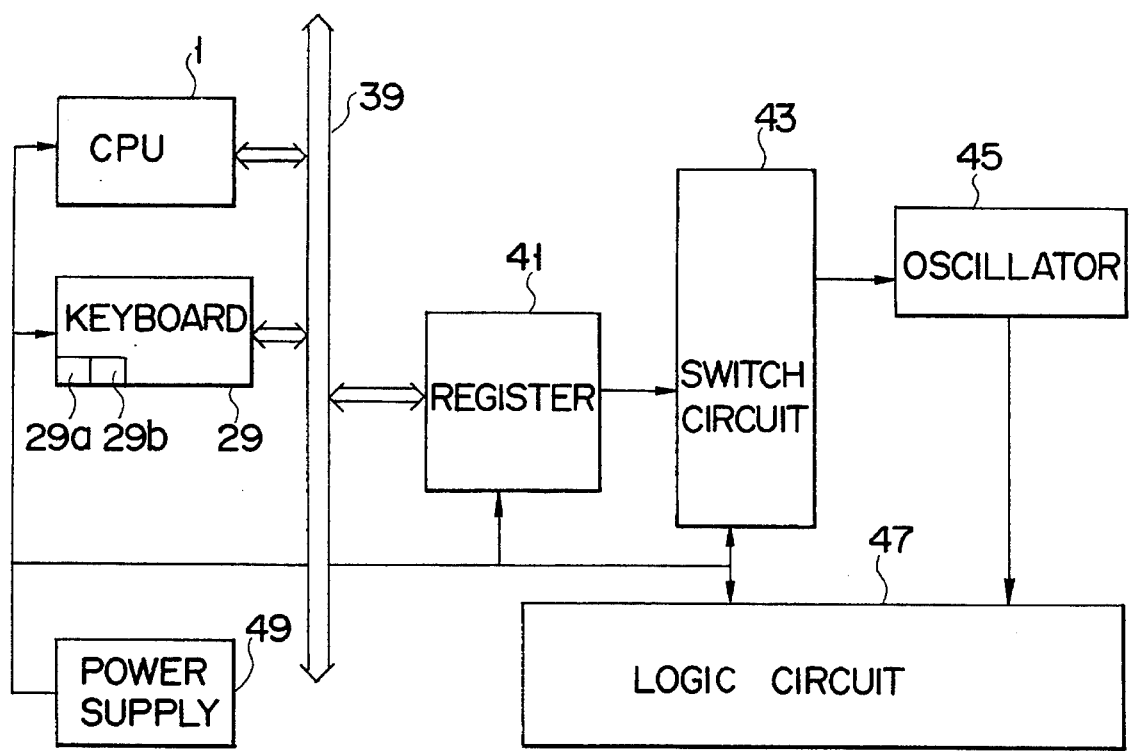
F I G. 2
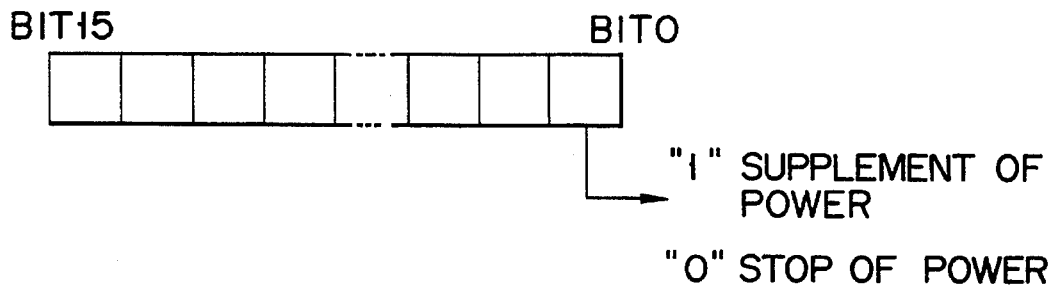
F I G. 3

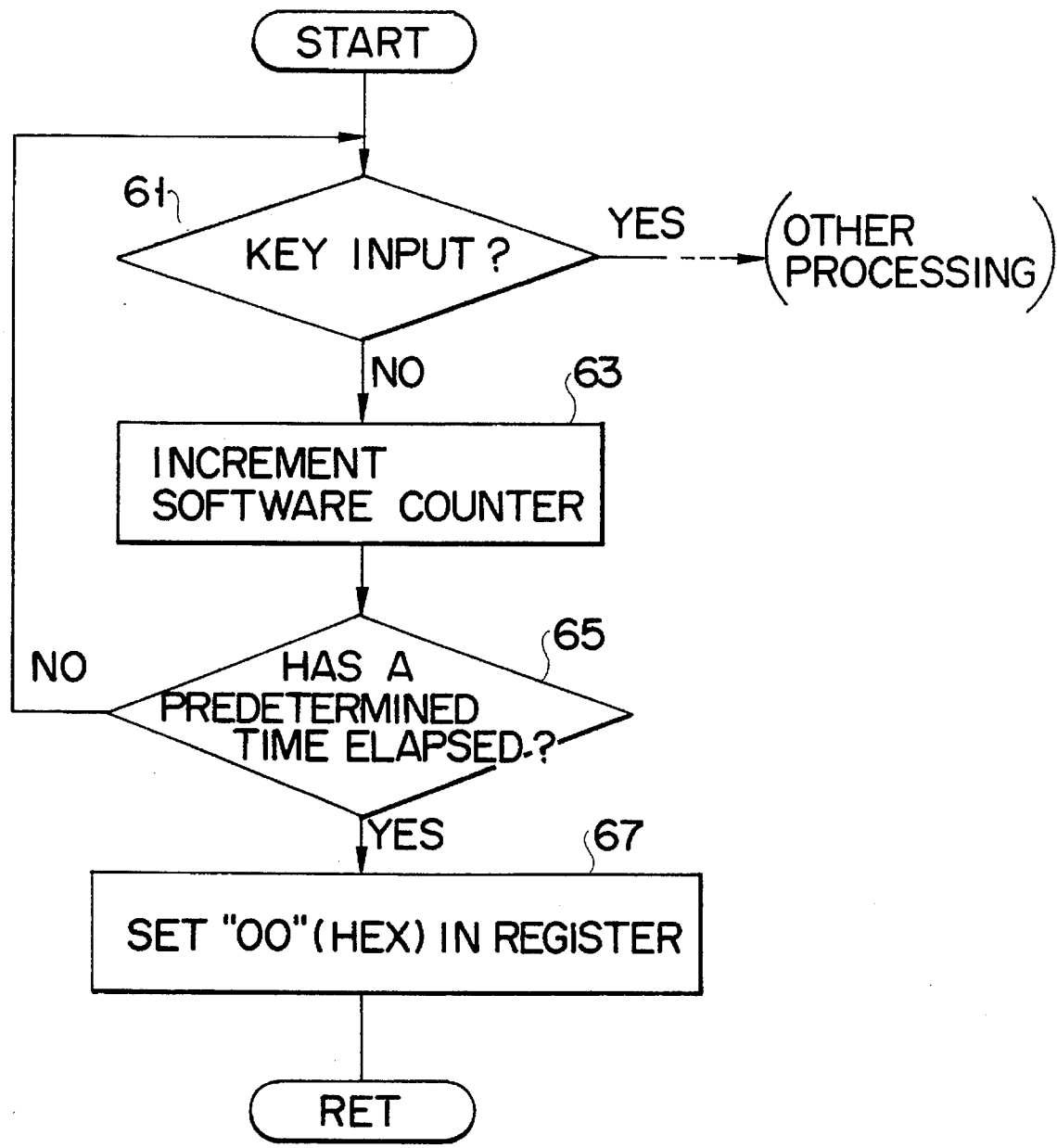
F I G. 5

POWER SAVING SYSTEM

This application is a continuation of application Ser. No. 08/206,275, filed Mar. 7, 1994, now abandoned, which was a continuation of application Ser. No. 08/084,963, filed Jul. 2, 1993, now abandoned, which was a continuation of application Ser. No. 07/875,217 filed Apr. 28, 1992 and now abandoned, which was a continuation of application Ser. No. 07/772,122 filed Oct. 9, 1991 and now abandoned, which was a continuation of application Ser. No. 07/472,065 filed Jan. 30, 1990 and now abandoned.

BACKGROUND OF THE INVENTION

1. Field of the Invention

The present invention relates to a power saving system having a logic circuit constituted by CMOS (Complementary Metal Oxide Semiconductor) elements and applied to, e.g., a personal computer.

2. Description of the Related Art

In recent years, various types of chips such as microprocessor, memory and LSI chips are manufactured along with developments in semiconductor technologies, and packing densities of these chips are increasing year by year. As a result, compact personal computers have been developed, and for example, compact, light-weight, portable personal computers called lap-top computers have been very popular in place of desk-top personal computers. Most of the lap-top computers are designed as battery-operated computers. For this reason, these computers are designed to minimize power consumption of the internal circuits in order to prolong the operating time.

It is known that power consumption of a CMOS is minimized when a clock pulse is not supplied. A power-saving implementation is proposed wherein LSIs (Large Scale Integration Circuits) used in internal circuits of computers are arranged by CMOS elements.

Wasteful power consumption such as power consumption required for waiting for a key input from a keyboard is still present. Strong demand has arisen for further power saving.

SUMMARY OF THE INVENTION

It is an object of the present invention to provide a power saving system which utilizes CMOS characteristics which exhibit minimum power consumption in the absence of input clock pulses, thereby performing power saving in accordance with a software instruction.

According to the first aspect of the present invention, a power saving system for a personal computer which includes a logic circuit constituted by highly integrated semiconductor elements, comprises: a power supply for supplying power; clock signal generating means for receiving the power from the power supply and supplying a clock signal to the logic circuit; keyboard means including at least a power supply designation key for designating power supply to the clock signal generating means and a power supply stop designation key for designating stop of power supply to the clock signal generating means, and for outputting power supply designation information and power supply stop designation information; latch means for latching the power supply designation information or the power supply stop designation information from the keyboard means; and switch means, connected between the latch means and the clock signal generating means, for supplying the power to the clock signal generating means on the basis of the power supply designation information supplied from the latch means and for stopping power supply to the clock signal generating means on the basis of the power supply stop designation information supplied from the latch means.

According to the second aspect of the present invention, a power saving system for a personal computer which includes a logic circuit constituted by highly integrated semiconductor elements and receives an input signal and outputs a predetermined signal, comprises: a power supply for supplying power; clock signal generating means for receiving the power from the power supply and supplying a clock signal to the logic circuit; latch means for latching power supply stop designation information; memory means for storing a control program serving as a logic circuit driver routine executed by the personal computer, the control program determining whether a predetermined signal is output from the logic circuit within a predetermined period of time and setting the power supply stop designation information in the latch means when the predetermined signal is not output within the predetermined period of time; and switch means, connected between the latch means and the clock signal generating means, for stopping power supply to the clock signal generating means on the basis of the power supply stop designation information supplied from the latch means.

According to the third aspect of the present invention, a power saving system for a personal computer, comprises: a power supply for supplying power; extended card means, optionally connectable to the personal computer, for executing a predetermined logical function; clock signal generating means for receiving the power from the power supply and supplying a clock signal to the extended card means; latch means for latching power supply designation information or power supply stop designation information; memory means for storing a program serving as an extended card driver routine executed by the personal computer, the program including an initialization routine for setting the power supply designation information in the latch means and a completion routine for setting the power supply stop designation information in the latch means after a predetermined function is executed by the extended card means; and switch means, connected between the latch means and the clock signal generating means, for supplying the power to the clock signal generating means on the basis of the power supply designation information supplied from the latch means and for stopping power supply to the clock signal generating means on the basis of the power supply stop designation information supplied from the latch means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

Other objects and features of the present invention will be apparent from the following description taken in connection with the accompanying drawings, in which:

FIG. 1 is a block diagram showing an arrangement of a personal computer which employs a power saving system according the present invention;

FIG. 2 is a block diagram of a power saving system according to the first embodiment of the present invention;

FIG. 3 is a data format showing bit assignment of a register shown in FIG. 2;

FIG. 5 is a flow chart for controlling power supply by time-out;

DETAILED DESCRIPTION OF THE PREFERRED EMBODIMENTS

Figure 4:
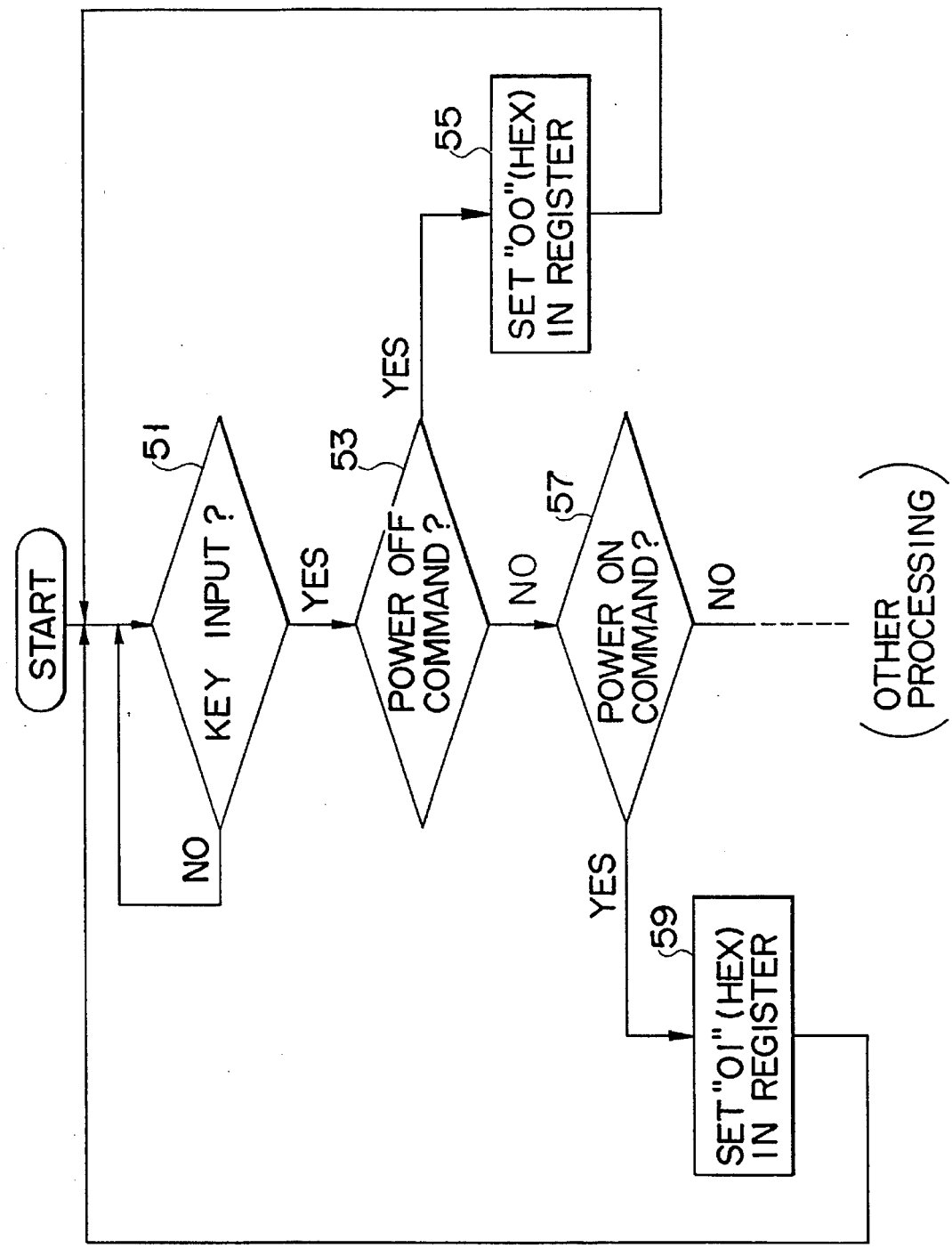
FIG. 4 is a flow chart for controlling power supply upon operations of power ON and OFF keys arranged on a keyboard.

FIG. 1 is a block diagram showing an arrangement of a personal computer which employs a power saving system according to the present invention.

Referring to FIG. 1, a CPU (Central Processing Unit) 1 controls the overall system operations of the personal computer. A ROM (Read Only Memory) 3 stores a basic input and output operating system (BIOS) program for controlling inputs/outputs of the personal computer. This BIOS includes programs represented by flow charts of FIGS. 4 to 6. A RAM (Random Access Memory) 5 stores application programs executed by this personal computer and various data. A DMAC (Direct Memory Access Controller) 7 comprises a commercially available LSI for controlling DMA. A PIC (Interrupt Controller) 9 comprises a commercially available LSI for controlling various circuit interrupts. A PIT (timer) 11 measures time. An RTC (Real Time Clock) 13 comprises a commercially available LSI for storing date, time, an the like.

An HDC (Hard Disk Controller) 15 comprises a commercially available LSI for controlling an HDD (Hard Disk Driver) 17. The HDD (Hard Disk Drive) 17 serves as an external storage unit for storing programs and data. An FDC (Floppy Disk Controller) 19 comprises a commercially available LSI for controlling an FDD (Floppy Disk Drive) 21. The FDD 21 serves as an external storage unit for storing programs and data as in the HDD 17. A PRTCONT (Printer Controller) 23 controls a printer. An SIO (Serial Input and Output Control Circuit) 25 comprises a commercially available LSI for controlling communication. A KBC (Keyboard Controller) 27 comprises a commercially available LSI for controlling a keyboard 29. The keyboard 29 comprises various keys for inputting various data and includes a power ON command key 29a for designating power supply and a power OFF command key 29b for designating power of power supply. A PDPC (Plasma Display Controller) 31 controls a PDP (Plasma Display) 33. A VRAM (Video RAM) 35 serves as a memory for storing the content displayed on the PDP 33. Data is read out from a kanji ROM 37 to display kanji characters, and the readout kanji information is displayed on the PDP 33. The CPU 1, the ROM 3, the RAM 5, the DMAC 7, the PIC 9, the PIT 11, the RTC 13, the HDC 15, the FDC 19, the PRTC 23, the SIO 25, the KBC 27, the PDPC 31, the VRAM 35, and the kanji ROM 37 are connected to a system bus 39.

FIG. 2 is a block diagram showing a power saving system according to the first embodiment of the present invention.

A register 41 is connected to the system bus 39. The register 41 stores control data for ON/OFF-controlling the power supply. More specifically, the register 41 comprises, e.g., a 16-bit register. As shown in FIG. 3, bit information for controlling power ON/OFF is assigned to, e.g., bit 0. That is, when bit 0 is set at logic "1", the power is supplied to the respective circuits. However, when bit 0 is set at logic "0", the power OFF state is set. A bit output from the register 41 is supplied to a switch circuit 43. This register 41 may be assigned to the RAM 5 in the form of, e.g., a memory mapped I/O. Alternatively, I/O device addresses may be assigned to this register. In either case, the register 41 can be accessed by software.

The switch circuit 43 comprises an electronic switch (constituted by, e.g., transistors) or a relay circuit. When a bit output from the register 41 is set at logic "1", the power is supplied from a power supply 49 to an oscillator 45. However, when the bit output is set at logic "0", the power supply is stopped. When the oscillator 45 receives the power through the switch circuit 43, the oscillator 45 outputs a clock signal to a logic circuit 47. The power supply 49 is connected to supply the power to the CPU 1, the keyboard 29, the register 41, the switch circuit 43, and the logic circuit 47. The logic circuit 47 comprises a CMOS circuit for performing a predetermined function. For example, in the block diagram of FIG. 1, the logic circuit 47 corresponds to the DMAC 7, the PIC 9, the PIT 11, the RTC 13, the FDC 19, the PRTC 23, the SIO 25, the KBC27, the PDC 31, and the like. Although not illustrated, the logic circuit 47 also includes a LAN (Local Area Network) controller and a MODEM (Modulator/Demodulator).

Power supply or stop of power supply can be designated automatically or by an operator. The flow chart shown in FIG. 4 exemplifies an operation for detecting depression of the power OFF or ON command key 29a or 29b arranged on the keyboard 29 and for allowing or stopping power supply from the power supply to the oscillator 45.

The CPU 1 determines in step 51 whether a key input is detected. If YES in step 51, the CPU 1 determines in step 53 whether the depressed key is the power OFF command key 29b. When the CPU 1 determines in step 53 that the power OFF command key 29b is depressed, the CPU 1 sets data "00" (hex) in the register 41 in step 55. Bit data of "0" is supplied from the register 41 to the switch circuit 43, and the switch circuit 43 does not supply the power to the oscillator 45. In this case, no clock signal is supplied from the oscillator 45 to the logic circuit 47. The power consumption of the logic circuit 47 becomes minimum, and the power can be saved.

When the CPU determines in step 57 that the power ON command key 29a is depressed, the CPU 1 sets data "01" (hex) in the register 41 in step 59. As a result, bit data of "1" is supplied from the register 41 to the switch circuit 43, and then the switch circuit 43 supplies the power from the power supply 49 to the oscillator 45. Therefore, the oscillator 45 supplies a clock signal to the logic circuit 47, and the logic circuit is operated.

FIG. 5 is a flow chart showing an operation for automatically controlling power supply to the KBC (Keyboard Controller) 27.

The CPU 1 determines in step 61 whether a key input is detected. If NO in step 61, a time-measuring software counter is incremented in step 63. The CPU 1 then determines in step 65 whether a predetermined period of time has elapsed. If NO in step 65, the CPU 1 repeats the operations in steps 61, 63, and 65. When the CPU 1 determines in step 65 that the predetermined period of time has elapsed, the CPU 1 sets data "00" (hex) in the register 41 in step 67. As described above, in this case, the switch circuit 43 does not supply the power to the oscillator 45, and the oscillator 45 does not supply the clock signal to the logic circuit 47 accordingly. As a result, the power consumption of the logic circuit 47 becomes minimum, and the power can be saved.

Figure 6:
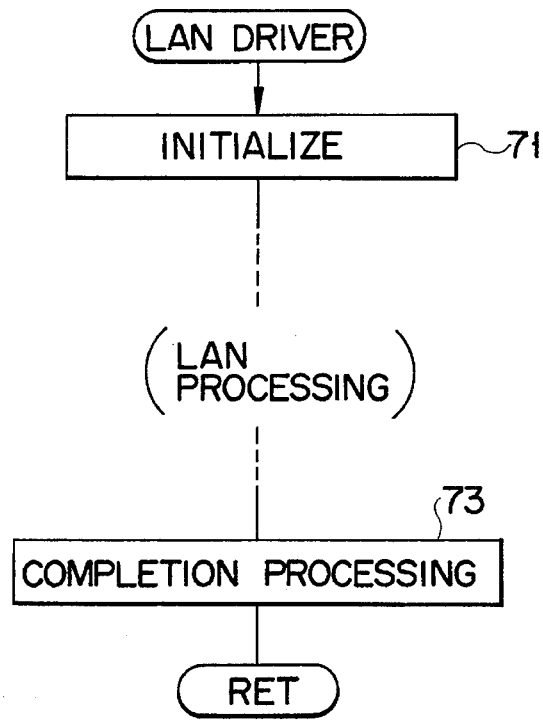
FIG. 6 is a flow chart in which power supply control is utilized in a driver routine of an extended card optionally connected to the power saving system.

FIG. 6 is a flow chart showing an operation for automatically controlling power supply or stop of power supply when, e.g., a LAN drive routine is loaded or unloaded.

Assume that the system bus of the personal computer shown in FIG. 1 is connected to an external connector (not shown), and that a LAN control card serving as an extended card can be optionally connected to this personal computer. In this case, the LAN driver routine is prestored in the HDD 17. In order to perform LAN control, the LAN driver routine stored in the HDD 17 is loaded in the RAM 5 and is executed by the CPU 1.

In step 71 as an initialization routine, the CPU 1 sets data "01" (hex) in the register 41. The switch circuit 43 supplies the power to the oscillator 45, and the oscillator 45 then supplies a clock signal to the logic circuit 47 (in this case, to the LAN card). The LAN card is then operated. After the predetermined LAN processing routine is executed, the CPU 1 performs completion processing in step 73. In this completion processing, the CPU 1 sets data "00" (hex) in the register 41. In this case, the switch circuit 43 stops supplying the power to the oscillator 45. Therefore, the power consumption of the LAN card becomes minimum, and the power can be saved.

Figure 7:
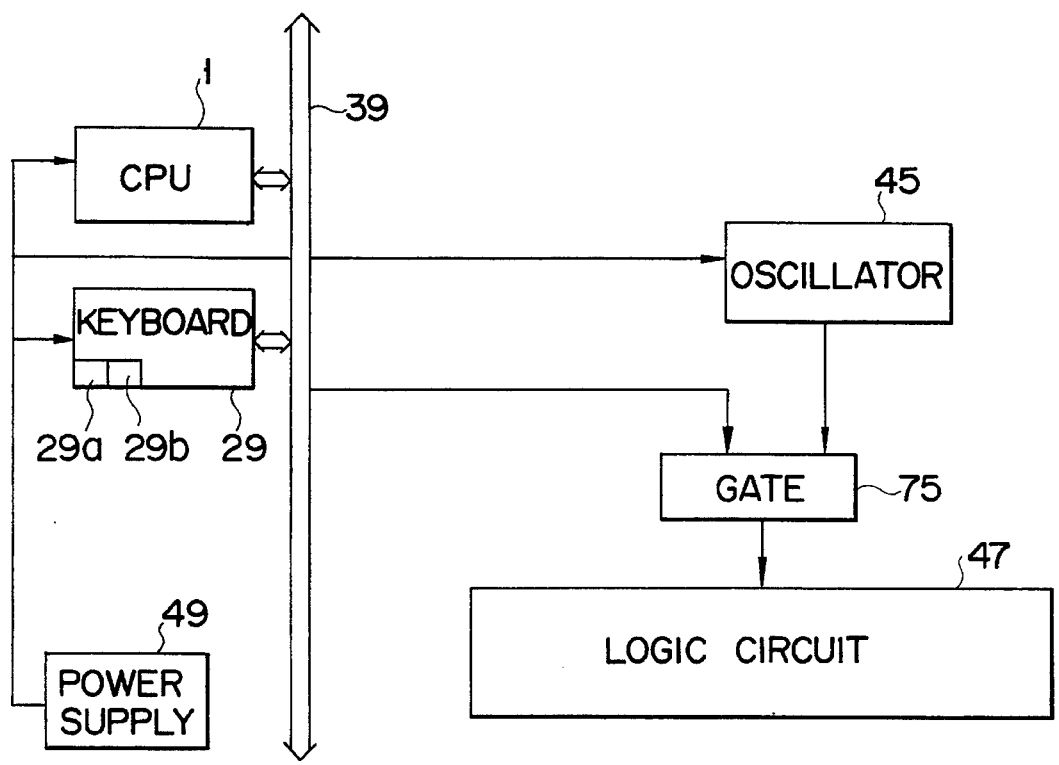
FIG. 7 is a block diagram showing a power saving system according to the second embodiment of the present invention.

FIG. 7 is a block diagram of a power saving system according to the second embodiment of the present invention. The same reference numerals as in FIG. 1 denote the same parts in FIG. 2, and a detailed description thereof will be omitted.

In the embodiment shown in FIG. 7, power from a power supply 49 is always supplied to an oscillator 45. A clock signal is supplied from the oscillator 45 to a gate circuit 75. The gate circuit 75 comprises, e.g., an AND gate and supplies a clock signal from the oscillator 45 to a logic circuit 47 in response to an enable signal from a CPU 1. The enable signal supplied from the CPU 1 may be supplied from a keyboard as in FIG. 2 or may be obtained by utilizing the concept of time-out, as shown in FIG. 4, or an enable or disable signal may be formed in the initialization and completion routines in the extended load module, as shown in FIG. 6. The same effect as in the embodiment of FIG. 2 can be obtained in the above modifications.

In the second embodiment, the LAN card is exemplified as the extended card. However, the present invention is not limited to this. For example, power supply of various external optional cards such as an SCSI (Small Computer System Interface) control card, various communication boards, a keyboard controller, a printer controller, a display circuit controller, and a modem card can be controlled.

In the above embodiment, the programs shown in FIGS. 4 to 6 are stored in the ROM 3. However, these programs may be stored in, e.g., the HDD 17 and the FDD 21.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A power saving system for a battery-powered computer, the computer including a system bus, a logic circuit including CMOS (Complementary Metal Oxide Semiconductor) LSI (Large Scale Integration) elements connected to said system bus, and including at least one of a LAN (Local Area Network) control circuit, a SCSI (Small Computer System Interface) control circuit, a communication controller, a printer controller, a display controller, and a modem control circuit, connected to said system bus, said power saving system comprising:

power supply means for supplying power;

clock signal generating means, coupled to said power supply means, for generating a clock signal;

designating means, having alphanumeric data input means and connected to said system bus via said keyboard controller, for selectively activating a power supply designator and a power supply stop designator, the activation of the power supply designator indicating that power should be supplied to said clock signal generating means, and the activation of said power supply stop designator indicating that supply of power to said clock signal generating means should be ceased;

keyboard controller, connected to said system bus, for controlling the designating means and for generating, in response to activation of at least one of the power supply designator and the power supply stop designator, information including power supply designation information and power supply stop designation information;

latch means, connected to said logic circuit, for receiving and latching at least one of the power supply designation information and the power supply stop designation information from said keyboard controller; and switch means, connected between said latch means and said clock signal generating means and to said power supply means, for conducting the power from said power supply means to said clock signal generating means on the basis of the power supply designation information supplied from said latch means, to thereby supply the clock signal to said logic circuit, and for stopping power from said power supply means to said clock signal generating means on the basis of the power supply stop designation information supplied from said latch means, to thereby stop supply of the clock signal to said logic circuit.

2. The system according to claim 1, wherein at least one of the LAN control circuit, the SCSI control circuit, the communication controller, the printer controller, the display controller, and the modem control circuit is in a form of an extended card detachably connectable to the personal computer.

3. The system according to claim 1, wherein said designating means is a keyboard.

4. A power saving system for a battery-powered computer including a system bus, a logic circuit connected to said system bus and including CMOS (Complementary Metal Oxide Semiconductor) LSI (Large Scale Integration) elements, and at least one of a LAN (Local Area Network) control circuit, a SCSI (Small Computer System Interface) control circuit, a communication controller, a printer controller, a display controller, and a modem control circuit, connected to said system bus, said power saving system comprising:

power supply means for supplying power;

clock signal generating means, connected to said logic circuit, for receiving the power from said power supply and for outputting a clock signal;

designating means, having alphanumeric data input means and connected to said system bus via said keyboard controller, for selectively activating a clock supply designator and a clock supply stop designator, the activation of the clock supply designator indicating that the clock signal should be supplied to said logic circuit, and the activation of the clock supply stop designator indicating that supply of the clock signal to said logic circuit should be ceased;

keyboard controller, connected to said system bus, for controlling the designation means and for outputting clock supply designation information and clock supply stop designation information; and gate means, connected between said clock signal generating means and said logic circuit, for receiving the clock supply designation information from said keyboard controller and supplying the clock signal from said clock signal generating means to said logic circuit, and for receiving the clock supply stop designation information from said keyboard controller and stopping supply of the clock signal to said logic circuit.

5. The System according to claim 4, wherein at least one of the LAN control circuit, the SCSI control circuit, the communication controller, the printer controller, the display controller, and the modem control circuit is in a form of an extended card detachably connectable to the personal computer.

6. The system according to claim 4, wherein said designating means is a keyboard.

7. A power saving system for a battery-powered computer, including a system bus, a logic circuit including CMOS (Complementary Metal Oxide Semiconductor) LSI (Large Scale Integration) elements, and including at least one of a LAN (Local Area Network) control circuit, a SCSI (Small Computer System Interface) control circuit, connected to said system bus, a communication controller, a printer controller, a display controller, and a modem control circuit, said power saving system comprising:

power supply means for supplying power;

clock signal generating means, coupled to said logic circuit and said power supply, for generating a clock signal and for supplying the clock signal to said logic circuit;

designating means, having alphanumeric data input means and connected to said system bus via said keyboard controller, for selectively activating a power supply designator, and for generating, in response to activation of the power supply designator, information including power supply designation information and power supply stop designation information, the activation of the power supply designator indicating power should be supplied to the clock signal generating means and the deactivation of the power supply designator indicating that the supply of power to the clock signal generating means should be ceased;

keyboard controller, connected to said system bus, for controlling the designating means;

latch means, connected to said logic circuit, for receiving and latching at least one of the power supply designation information and the power supply stop designation information from said keyboard controller; and switch means, connected between said latch means and said clock signal generating means, for conducting the power from said power supply means to said clock signal generating means on the basis of the power supply designation information supplied from said latch means, to thereby supply the clock signal to said logic circuit, and for stopping power from said power supply means to said clock signal generating means on the basis of the power supply stop designation information supplied from said latch means, to thereby stop supply of the clock signal to said logic circuit.

8. The system according to claim 7, wherein said designating means is a keyboard.

9. A power saving system for a battery-powered computer including a system bus, a logic circuit including CMOS (Complementary Metal Oxide Semiconductor), LSI (Large Scale Integration) elements connected to said system bus, and including at least one of a LAN (Local Area Network) control circuit, a SCSI (Small Computer System Interface) control circuit, a communication controller, a printer controller, a display controller, and a modem control circuit, connected to said system bus, said power saving system comprising:

power supply means for supplying power;

designating means, having alphanumeric data input means and connected to said system bus via said keyboard controller, for selectively activating a power supply designator and a power supply stop designator, the activation of the power supply designator indicating that power should be supplied to said clock signal generating means, and the activation of said power supply stop designator indicating that supply of power to said clock signal generating means should be ceased, and for generating, in response to activation of the one of the designators, information including power supply designation information and power supply stop designation information;

keyboard controller, connected to said system bus, for controlling the designating means;

memory means, connected to said logic circuit for receiving and latching at least one of the power supply designation information and the power supply stop designation information from said designating means;

switch means, connected between said memory means and said clock signal generating means, for conducting the power from said power supply means to said clock signal generating means on the basis of the power supply designation information supplied from said memory means, to thereby supply the clock signal to said logic circuit, and for stopping power from said power supply means to said clock signal generating means on the basis of the power supply stop designation information supplied from said memory means, to thereby stop supply of the clock signal to said logic circuit; and clock signal generating means for receiving the power from said power supply means via the switch means and supplying a clock signal to said logic circuit.

10. The system according to claim 9, wherein said designating means is a keyboard.

11. A power saving system for a battery-powered computer including a system bus, an input and output (I/O) device including a hard disk drive connected to the system bus, said power saving system comprising:

power supply means for supplying power;

keyboard means including at least a power supply designation key for designating power supply to said I/O device and a power supply stop designation key for designating stoppage of power supply to said I/O device, and for outputting power supply designation information and power supply stop designation information;

switch means, connected to said power supply means and said keyboard means, for conducting the power from said power supply means to said I/O device in response to the power supply designation information supplied from said power supply designation key, and for stopping power from said power supply means to said I/O device in response to the power supply stop designation information supplied from said power supply stop designation key.

12. A power saving system for a battery-powered computer including a system bus, an input and output (I/O) device including a hard disk drive connected to the system bus, said power saving system comprising:

power supply means for supplying power;

clock signal generating means, coupled to said power supply means, for generating a clock signal;

keyboard means including at least a power supply designation key for designating power supply to said I/O device and a power supply stop designation key for designating stoppage of power supply to said I/O device, and for outputting power supply designation information and power supply stop designation information;

switch means, connected to said keyboard means, said clock signal generating means and to said power supply means, for conducting the power from said power supply means to said clock signal generating means in response to the power supply designation information supplied from said power supply designation key, to thereby supply the clock signal to said I/O device, and for stopping power from said power supply means to said clock signal generating means in response to the power supply stop designation information supplied from said power supply stop designation key, to thereby stop supply of the clock signal to said I/O device.

* * * * *